(12) United States Patent
Zhu et al.

(10) Patent No.: US 10,141,777 B2
(45) Date of Patent: Nov. 27, 2018

(54) THREE-PORT CONVERTOR HAVING INTEGRATED MAGNETIC AND ZERO-PORT CURRENT RIPPLE

(71) Applicant: SHENZHEN AEROSPACE NEW POWER TECHNOLOGY LTD., Guangdong (CN)

(72) Inventors: Hongyu Zhu, Guangdong (CN); Donglai Zhang, Guangdong (CN); Bowen Zhang, Guangdong (CN)

(73) Assignee: SHENZHEN AEROSPACE NEW POWER TECHNOLOGY LTD., Guangdong (CN)

( * ) Notice: Subject to any disclaimer, the term of this patent is extended or adjusted under 35 U.S.C. 154(b) by 0 days.

(21) Appl. No.: 15/528,101

(22) PCT Filed: Apr. 30, 2015

(86) PCT No.: PCT/CN2015/078054
§ 371 (c)(1),
(2) Date: Sep. 14, 2017

(87) PCT Pub. No.: WO2016/078350
PCT Pub. Date: May 26, 2016

(65) Prior Publication Data
US 2018/0241243 A1    Aug. 23, 2018

(30) Foreign Application Priority Data

Nov. 21, 2014  (CN) .......................... 2014 1 0677018

(51) Int. Cl.
*H02J 7/35*    (2006.01)
*H02M 1/14*    (2006.01)
(Continued)

(52) U.S. Cl.
CPC ................. *H02J 7/35* (2013.01); *H02M 1/14* (2013.01); *H02M 1/44* (2013.01); *H02M 3/155* (2013.01);
(Continued)

(58) Field of Classification Search
CPC .. H02J 7/35; H02M 1/14; H02M 1/44; H02M 3/155; H02M 3/22; H02M 2001/0083
See application file for complete search history.

(56) References Cited

U.S. PATENT DOCUMENTS 6,232,752 B1 *  5/2001  Bissell ................ H02M 3/1582
                                          323/222
6,304,065 B1 * 10/2001  Wittenbreder ........ H02M 3/005
                                          323/225
(Continued)

FOREIGN PATENT DOCUMENTS

CN    103199704    7/2013
CN    103384115    11/2013
CN    104518672    4/2015

OTHER PUBLICATIONS

"International Search Report (Form PCT/ISA/210)", dated Aug. 26, 2015, with English translation thereof, pp. 1-4.
"Written Opinion of the International Searching Authority (Form PCT/ISA/237)" of PCT/CN2015/078054, dated Aug. 24, 2015, with English translation thereof, pp. 1-10, in which two of the listed reference (CN103199704A) was cited.

*Primary Examiner* — Jue Zhang
(74) *Attorney, Agent, or Firm* — JCIPRNET

(57) ABSTRACT

The present invention provides a three-port converter with magnetic integration and current ripple cancellation. With magnetic integration technology, the number of magnetic rings is reduced, and the number of driving coupling transformers is also reduced, thereby greatly reducing the size and weight of the whole converter; and with a current ripple
(Continued)

cancellation branch, the amount of current ripples flowing through the three ports is very low and close to zero. The three-port converter of the present invention reduces the influence of electromagnetic interference and simultaneously saves the filter cost so that the busbar current and battery current are smoother.

8 Claims, 3 Drawing Sheets

(51) Int. Cl.
    *H02M 3/155*     (2006.01)
    *H02M 3/22*     (2006.01)
    *H02M 1/44*     (2007.01)
    *H02M 1/00*     (2006.01)

(52) U.S. Cl.
    CPC ...... *H02M 3/22* (2013.01); *H02M 2001/0083* (2013.01)

(56) References Cited

U.S. PATENT DOCUMENTS

| | | | | |
|---|---|---|---|---|
| 6,304,460 | B1 * | 10/2001 | Cuk | H02M 1/34 363/131 |
| 6,437,999 | B1 * | 8/2002 | Wittenbreder | H02M 3/158 363/39 |
| 7,701,182 | B2 * | 4/2010 | Yoshida | H02M 3/158 323/272 |
| 2005/0073863 | A1 * | 4/2005 | de Rooij | H02M 1/12 363/39 |
| 2005/0243579 | A1 * | 11/2005 | Jang | H02M 3/335 363/16 |
| 2008/0074911 | A1 * | 3/2008 | Petter | H02M 1/14 363/65 |

* cited by examiner

THREE-PORT CONVERTOR HAVING INTEGRATED MAGNETIC AND ZERO-PORT CURRENT RIPPLE

CROSS-REFERENCE TO RELATED APPLICATION

This application is a 371 application of the international PCT application serial no. PCT/CN2015/078054, filed on Apr. 30, 2015, which claims the priority benefit of China application no. 201410677018.5, filed on Nov. 21, 2014. The entirety of each of the above-mentioned patent applications is hereby incorporated by reference herein and made a part of this specification.

BACKGROUND OF THE INVENTION

Technical Field

The present invention relates to a power converter, and in particular to a three-port converter.

Description of Related Art

A solar battery-storage battery direct-current power system generally takes solar energy as an input source, with a storage battery as a backup power source to supply power to a load jointly. Since the power of the input source, the storage battery, and the load needs to be managed simultaneously, two or more converters are generally required to fulfill a system power management task jointly. All the converters are controlled in a distributed manner, the system is large in size and heavy in weight, and multi-stage power conversion exists, leading to lower system efficiency. In the prior art as shown in FIG. 1, a three-port converter is typically used to substitute a plurality of independent converters to implement the system power management, discrete magnetic elements are used to enable energy flow through the three ports, thereby realizing product application, and the prior art is characterized in that all the ports are mutually isolated through a transformer winding, but it has the following problems and shortcomings:

1) an independent magnetic-ring inductor is used, the coupling driving of a transformer is included for a high-side MOS transistor, and magnetic integration technology is not used so that many magnetic elements are present;

2) each port has larger input and output ripples, there are also many filter capacitors, and with more devices and large size and weight, more space is occupied and the power density is reduced; and 3) the isolation driving of the transformer is insufficient for the switching control of a switching tube.

BRIEF SUMMARY OF THE INVENTION

To solve the problems in the prior art, the present invention provides a three-port converter with magnetic integration and zero port current ripple, which is capable of reducing the number of magnetic rings and the number of driving coupling transformers while reducing the influence of electromagnetic interference so that the amount of current ripples flowing through the three ports is close to zero.

The present invention is implemented with a technical solution as follows:

A three-port converter with magnetic integration and zero port current ripple comprises: an input terminal $V_{sa}$ of a solar battery, a busbar terminal $V_{bus}$, a storage battery terminal $V_{bat}$, a superboost circuit of a magnetic-integration magnetic ring, a bidirectional superbuck circuit, a first current ripple cancellation branch, a second current ripple cancellation branch, and a third current ripple cancellation branch; the solar battery transfers energy to the busbar terminal unidirectionally through the superboost circuit of the magnetic-integration magnetic ring; the superboost circuit of the magnetic-integration magnetic ring comprises an input capacitor $C_{in}$ of the solar battery, a busbar filter capacitor $C_{bus}$, a first N-MOSFET and a second N-MOSFET, a first inductor, a second inductor, and a fifth inductor; the storage battery transfers energy to the busbar terminal bidirectionally through the bidirectional superbuck circuit, and the bidirectional superbuck circuit comprises a third N-MOS transistor and a fourth N-MOS transistor, a freewheeling inductor $L_{N1}$ of the buck circuit, a third inductor, a fourth inductor, a fifth inductor, and a filter capacitor $C_{bat}$ of the storage battery terminal, wherein the input capacitor $C_{in}$ is connected with a solar battery constant-current source in parallel; the busbar filter capacitor $C_{bus}$ has one terminal connected with a busbar output terminal and has the other terminal grounded; the grid of the first N-MOSFET is connected with a first driving circuit through the first inductor, the dotted terminal of the first inductor is connected with the grid of the first N-MOSFET, the drain of the first N-MOSFET is connected with the input terminal of the solar battery, the source of the first N-MOSFET is connected with the dotted terminal of the fifth inductor, and the opposite terminal of the fifth inductor is grounded; the source of the second N-MOSFET is connected with the input terminal of the SA, the drain of the second N-MOSFET connected with the dotted terminal of the second inductor, the grid of the second N-MOSFET is connected with a second driving circuit, and the opposite terminal of the second inductor is connected with the busbar output terminal; a first capacitor has one terminal connected with the dotted terminal of the second inductor and the other terminal connected with the dotted terminal of the fifth inductor; the filter capacitor $C_{bat}$ of the storage battery terminal is connected with the storage battery in parallel, the drain of the third N-MOS transistor is connected with the drain of the second N-MOSFET, the source of the third N-MOS transistor is connected with the drain of the fourth N-MOS transistor, the grid of the third N-MOS transistor is connected with the dotted terminal of the third inductor, and the opposite terminal of the third inductor is connected with a third driving circuit; the source of the Q4 is connected with the dotted terminal of the $L_{N5}$, the grid of the fourth N-MOS transistor is connected with the dotted terminal of the fourth inductor, and the opposite terminal of the fourth inductor is connected with a fourth driving circuit; the source of the third N-MOS transistor is connected with the dotted terminal of the freewheeling inductor of the buck circuit, and the opposite terminal of the freewheeling inductor is connected with the input terminal of the storage battery; the first, second, fourth, and fifth inductors are wound on a magnetic ring, the freewheeling and third inductors are wound on the other magnetic ring; and the first and second current ripple cancellation branches are used for cancelling a current ripple at the solar input side, the third current ripple cancellation branch is used for cancelling a current ripple at the battery side, and each current ripple cancellation branch is formed by connecting an independent inductor, a winding wound on the magnetic ring and a thin film capacitor in series.

Further, the current ripple cancellation branch 1 includes a sixth inductor, a seventh inductor and a third capacitor C3, wherein the sixth inductor L7 has one terminal connected with the input terminal of solar battery and has the other terminal connected with the dotted terminal of the seventh inductor, and the opposite terminal of the seventh inductor is grounded through the third capacitor C3; the second current ripple cancellation branch comprises an eighth inductor, a ninth inductor and a second capacitor C2, wherein the eighth inductor has one terminal connected with the input terminal of the solar battery and has the other terminal connected with the dotted terminal of the ninth inductor, and the opposite terminal of the ninth inductor is grounded through the second capacitor C2; and the third current ripple cancellation branch comprises a tenth inductor, an eleventh inductor and a fourth capacitor C4, wherein the eleventh inductor has an opposite terminal connected with the input terminal of the storage battery and has a dotted terminal connected with one terminal of the tenth inductor, the other terminal of the tenth inductor is grounded through the fourth capacitor C4, wherein the seventh inductor is wound on the magnet ring, and the ninth and eleventh inductors are wound on the other magnet ring.

The present invention has the following advantageous effects: the three-port converter with magnetic integration and current ripple cancellation provided by the present invention applies to a solar battery and storage battery direct-current power system, an aerospace power system, an aircraft power system and a maritime power system. With an improved structure, the size and weight, the number of filter devices, and the input and output ripples are reduced, and the power density and stability are increased.

DETAILED DESCRIPTION OF THE INVENTION

The present invention is further illustrated below in combination with the description of the drawings and the particular embodiments.

Figure 2:
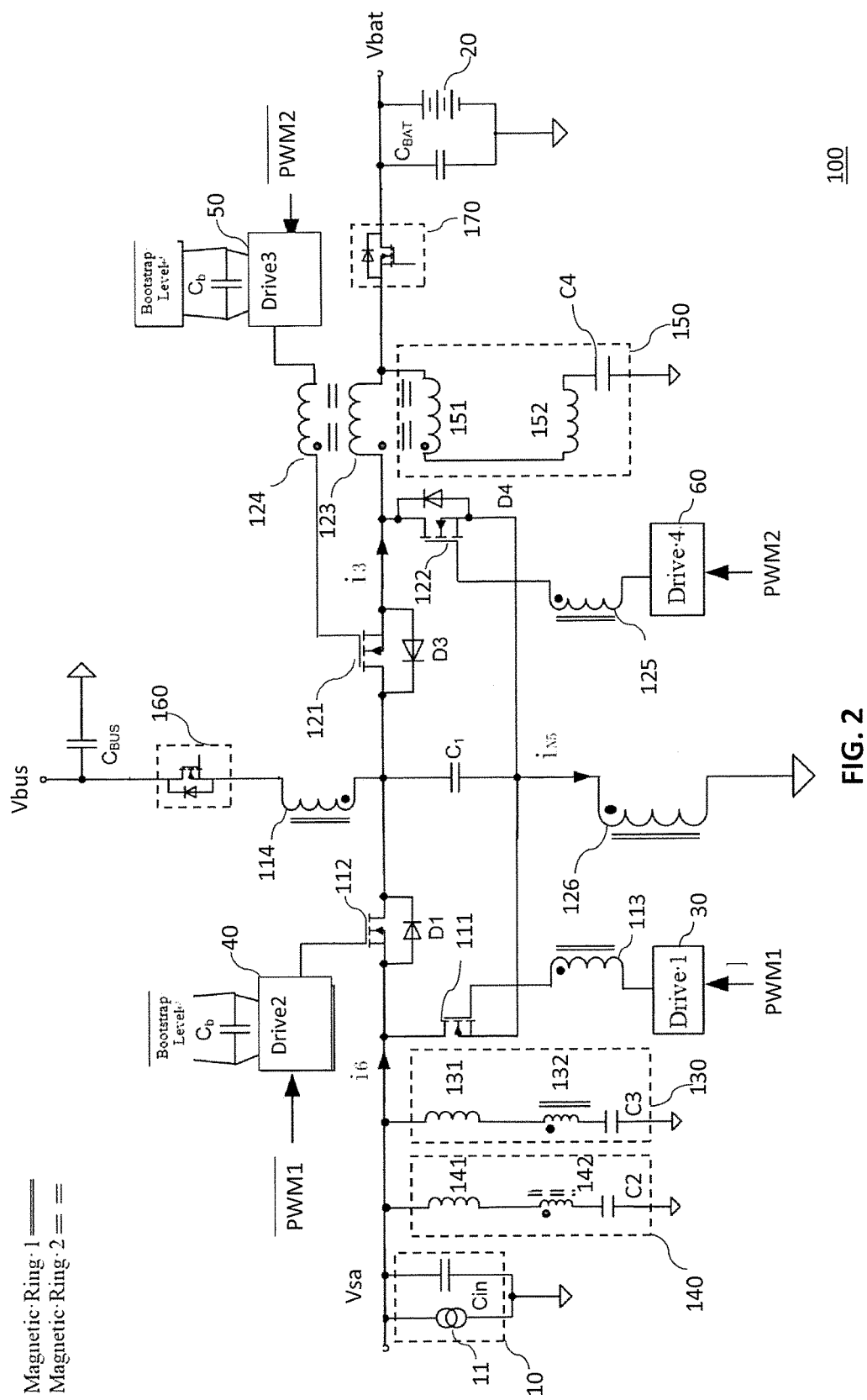
FIG. 2 is a circuit diagram of a three-port converter with magnetic integration and zero port current ripple in the present invention.

FIG. 2 shows a circuit diagram of a three-port converter 100 with magnetic integration and port current ripple cancellation in the present invention. The converter 100 comprises an input terminal $V_{sa}$ of a solar battery 10, a busbar terminal $V_{bus}$, a storage battery terminal $V_{bat}$, a superboost circuit of a magnetic-integration magnetic ring 110, a bidirectional superbuck circuit 120, and current ripple cancellation branches 130, 140, 150.

The superboost circuit of the magnetic-integration magnetic ring 110 is shown on the left of FIG. 2. The solar battery 10 transfers energy to the busbar terminal $V_{bus}$ unidirectionally through the superboost circuit of the magnetic-integration magnetic ring 110. The superboost circuit of the magnetic-integration magnetic ring 110 comprises an input capacitor $C_{in}$ (e.g., thin film capacitor 15 uF) of the solar battery 10, a busbar filter capacitor $C_{bus}$ (a capacitor array), a first N-MOSFET 111, a second N-MOSFET 112 (e.g., Model IRFP90N20D, responsible for boosting), a first inductor 113, and a second inductor 114. The storage battery 20 transfers energy to the busbar terminal bidirectionally through the bidirectional superbuck circuit 120, and the bidirectional superbuck circuit 120 comprises a third NMOS transistor 121, a fourth NMOS transistor 122 (e.g., Model IRFP90N20D), a freewheeling inductor 123 of the buck circuit, a third inductor 124, a fourth inductor 125, a fourth inductor 126, and a filter capacitor $C_{bat}$ (e.g., 15 uF) of the storage battery terminal $V_{bat}$. The input capacitor $C_{in}$ is connected with a solar battery constant-current source 11 in parallel. The busbar filter capacitor $C_{bus}$ has one terminal connected with a busbar output terminal and has the other terminal grounded. The grid of the first N-MOSFET 111 is connected with a first driving circuit 30 through the first inductor 113, where the dotted terminal of the first inductor 113 is connected with the grid of the first N-MOSFET 111, the drain of the first N-MOSFET 111 is connected with the input terminal of the solar battery 10, the source of the first N-MOSFET 111 is connected with the dotted terminal of the fifth inductor 126, and the opposite terminal of the fifth inductor 126 is grounded. The source of the second N-MOSFET 112 is connected with the input terminal of the solar battery 10, the drain of the second N-MOSFET 112 is connected with the dotted terminal of the second inductor 114, the grid of the second N-MOSFET 112 is connected with a second driving circuit 40, and the opposite terminal of the second inductor 114 is connected with a busbar output terminal. A first capacitor C1 has one terminal connected with the dotted terminal of the second inductor 114, and the other terminal is connected with the dotted terminal of the fifth inductor 126. The filter capacitor $C_{bat}$ of the storage battery terminal is connected with the storage battery 20 in parallel. The drain of the third NMOS transistor 121 is connected with the drain of the second N-MOSFET 112, the source of the third NMOS transistor 121 is connected with the drain of the fourth NMOS transistor 122, the grid of the third NMOS transistor 121 is connected with the dotted terminal of the third inductor 124, and the opposite terminal of the third inductor 124 is connected with a third driving circuit 50. The source of the fourth NMOS transistor 122 is connected with the dotted terminal of the fifth inductor 126, the grid of the fourth NMOS transistor 122 is connected with the dotted terminal of the fourth inductor 125, and the opposite terminal of the fourth inductor 125 is connected with a fourth driving circuit 60. The source of the third transistor 121 is connected with the dotted terminal of the freewheeling inductor 123 of the buck circuit 120, and the opposite terminal of the freewheeling inductor 123 is connected with the input terminal of the storage battery 20; and the first and second current ripple cancellation branches 130, 140 are used for cancelling the current ripple at the solar energy input side, the third current ripple cancellation branch 150 is used for cancelling the current ripple at the battery side, and each current ripple cancellation branch 130, 140, 150 is formed by connecting an independent inductor, a winding wound on the magnetic ring and a thin film capacitor in series. The first, second, third and fourth driving circuits 30, 40, 50, 60 are coupled to a PWM signal, respectively. The first driving circuit 30 is coupled to a first PWM signal PWM1. The second driving circuit 40 is coupled to an inverse of the first PWM signal PWM1. The third driving circuit 50 is coupled to a second PWM signal PWM2. The fourth driving circuit 60 is coupled to an inverse of the second PWM signal PWM2.

The first current ripple cancellation branch 130 includes a sixth inductor 131, a seventh inductor 132, and a third capacitor C3, wherein the sixth inductor 131 has one terminal connected with the input terminal of solar battery 10 and has the other terminal connected with the dotted terminal of the seventh inductor 132, and the opposite terminal of the seventh inductor 132 is grounded through the fifth capacitor 133. The second current ripple cancellation branch 140 includes an eighth inductor 141, a ninth inductor 142 and a second capacitor C2, wherein the eighth inductor 141 has one terminal connected with the input terminal of the solar battery 10 and has the other terminal connected with the dotted terminal of the ninth inductor 142, and the opposite terminal of the ninth inductor 142 is grounded through the sixth capacitor 143. The third current ripple cancellation branch 150 includes a tenth inductor 151, an eleventh inductor 152, and a fourth capacitor C4, wherein the tenth inductor 151 has an opposite terminal connected with the input terminal of the storage battery 20 and has a dotted terminal connected with one terminal of the eleventh inductor 152, the other terminal of the eleventh inductor 152 is grounded through the fourth capacitor C4, the first, second, fourth, fifth, seventh inductors 113, 114, 125, 126, 132 are wound on the magnet ring 1, and the freewheeling, third, ninth, and eleventh inductors 123, 124, 142, 152 are wound on the magnet ring 2.

A first solid-state current-limiting undervoltage protector 160 is provided between the opposite terminal of the second inductor 114 and the busbar output terminal, and a second solid-state current-limiting undervoltage protector 170 is also provided between the opposite terminal of the freewheeling inductor 123 and the battery terminal Vbat.

The solid-state current-limiting undervoltage protectors 160, 170 each includes an N-MOSFET and a diode, and the diode has a positive electrode connected with the source of the N-MOSFET, and has a negative electrode connected with the drain of N-MOSFET.

Diodes D1, D2, D3 are respectively provided between the sources and drains of the second, third and fourth NMOS transistors, and the diodes D1, D2, D3 each have positive electrode connected with the source of the corresponding NMOS transistor and negative electrode connected with the drain of the corresponding NMOS transistor.

Figure 3:
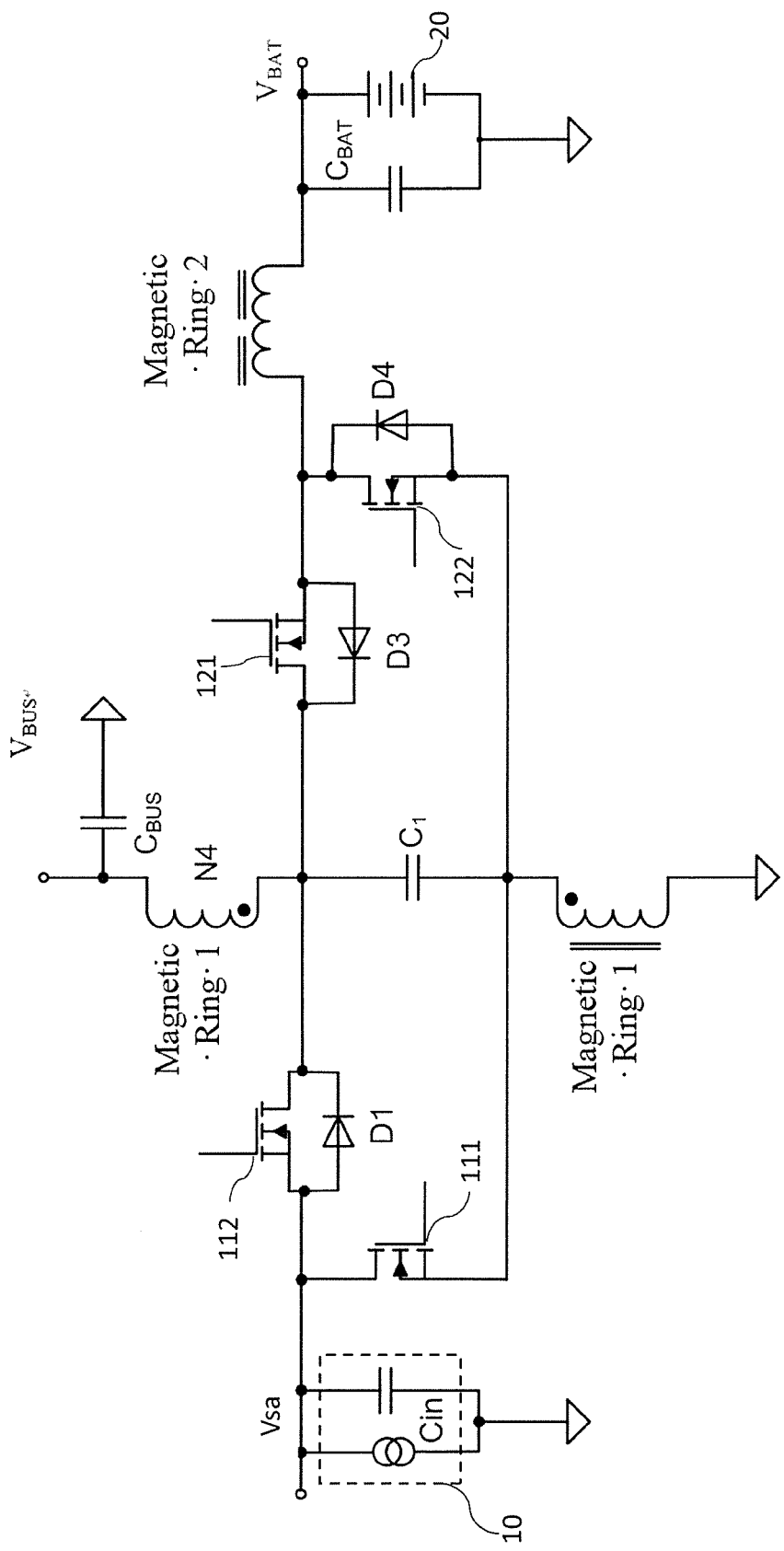
FIG. 3 is a simplified circuit diagram of the three-port converter of the present invention.

FIG. 3 is a simplified circuit diagram of the three-port converter 100 of the present invention, where the first and second N-MOSFET 111, 112 are complementary in signal, and the third and fourth NMOS transistors 121, 122 are complementary in signal. The third and fourth NMOS transistors 121, 122 are conducted complementarily, the third NMOS transistor 121 is used to fulfill a buck function when the battery 20 is charged, and the fourth NMOS transistor 122 is used to fulfill a boost function when the battery 60 discharges; and busbar filter capacitor $C_{bus}$ and a load form the superboost circuit 110, with $$V_{bus} = \frac{V_{SA}}{1 - \alpha_1}$$

($\alpha_1$ indicates a duty cycle). When the circuit works normally, a voltage on the first capacitor C1 is always equal to a busbar voltage $V_{bus}$, i.e. $V_{C1} = V_{bus}$.

Figure 1:
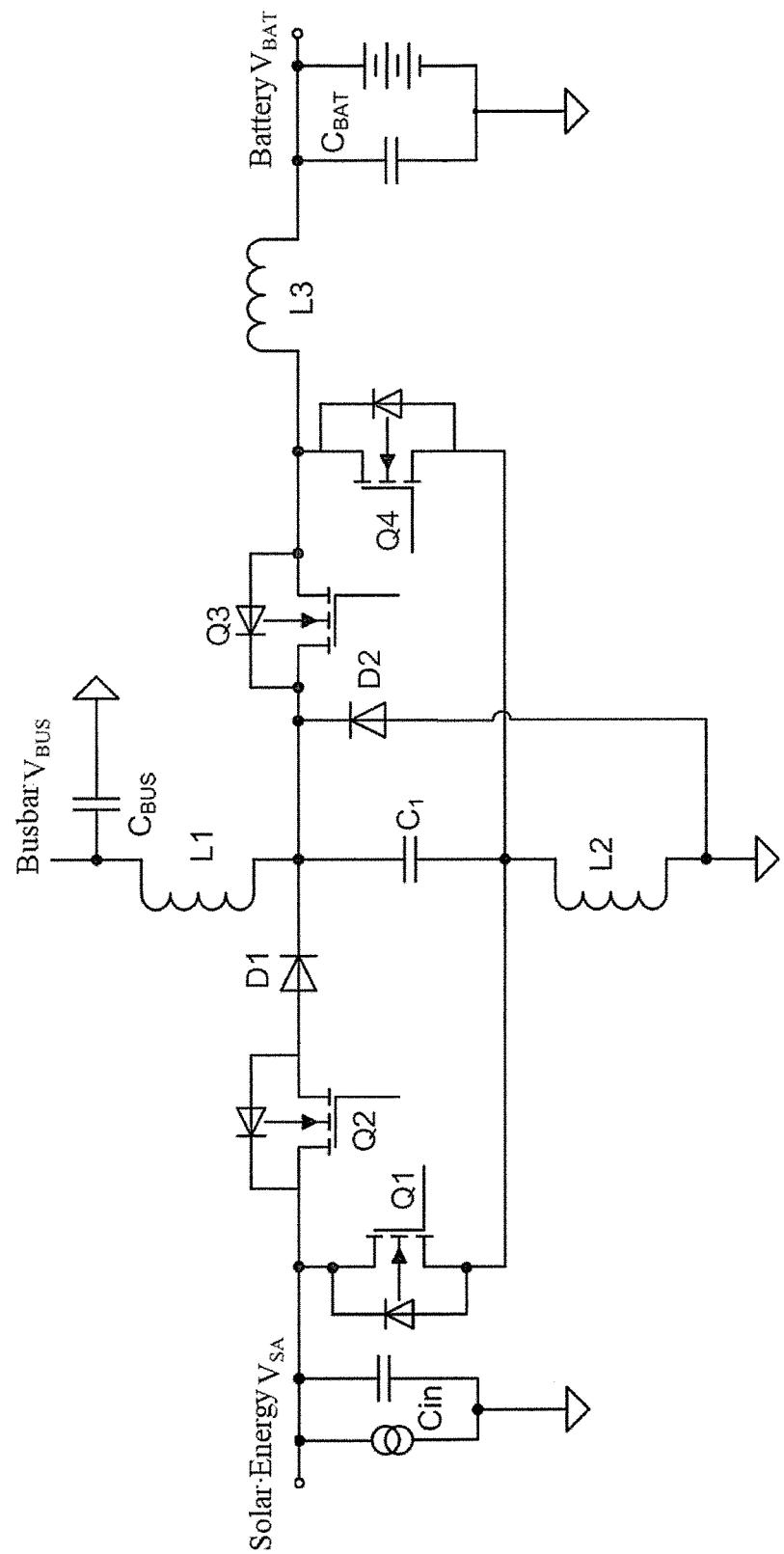
FIG. 1 is a circuit diagram of a three-port converter in the prior art.

For the three-port converter with magnetic integration and current ripple cancellation of the present invention, the number of magnetic rings is reduced (by jointly winding the inductors L1 and L2 illustrated in FIG. 1 on one upper magnetic ring, thereby eliminating one magnetic ring of the same size), and the number of the driving coupling transformers is also reduced (by omitting two-transformer coupling drivers), thereby greatly reducing the size and weight of the whole converter, so that the amount of current ripples flowing through the three ports is very low and close to zero. The three-port converter of the present invention reduces the influence of electromagnetic interference and simultaneously saves the filter cost so that the busbar current and battery current are smoother.

The above is to further illustrate the present invention in detail in combination with the particular preferred embodiments, but the particular embodiments of the present invention cannot be deemed to be limited by these illustrations. For those ordinarily skilled in the technical field to which the present invention belongs, a number of simple deductions or substitutions can be made also without departing from the concept of the present invention, and shall be deemed as falling within the protection scope of the present invention.

What is claimed is:

1. A three-port converter with magnetic integration and zero port current ripples, wherein the three-port converter comprises: an input terminal of a solar battery, a busbar terminal, a storage battery terminal, a superboost circuit of a magnetic-integration magnetic ring, a bidirectional superbuck circuit, a first current ripple cancellation branch, a second current ripple cancellation branch, and a third current ripple cancellation branch;

wherein the solar battery transfers energy to the busbar terminal unidirectionally through the superboost circuit of the magnetic-integration magnetic ring; the superboost circuit of the magnetic-integration magnetic ring comprises an input capacitor of the solar battery, a busbar filter capacitor, first and second N-MOSFETs, a first inductor, a second inductor, and a fifth inductor;

wherein the storage battery transfers energy to the busbar terminal bidirectionally through the bidirectional superbuck circuit, and the bidirectional superbuck circuit comprises a third N-MOS transistor, a fourth N-MOS transistor, a freewheeling inductor of the superbuck circuit, a third inductor, a fourth inductor, and the fifth inductor, and a filter capacitor of the storage battery terminal, wherein the input capacitor is connected with a solar battery constant-current source in parallel;

wherein the busbar filter capacitor has one terminal connected with a busbar output terminal and has the other terminal grounded;

wherein a grid of the first N-MOSFET is connected with a first driving circuit through the first inductor, a dotted terminal of the first inductor is connected with the grid of the first N-MOSFET, the drain of the first N-MOSFET is connected with the input terminal of the solar battery, the source of the first N-MOSFET is connected with the dotted terminal of the fifth inductor, and the opposite terminal of the fifth inductor is grounded;

wherein the source of the second N-MOSFET is connected with the input terminal of the solar battery, the drain of the second N-MOSFET is connected with the dotted terminal of the second inductor, the grid of the second N-MOSFET is connected with a second driving circuit, and the opposite terminal of the second inductor is connected with the busbar output terminal;

wherein a first capacitor has one terminal connected with the dotted terminal of the second inductor and the other terminal connected with the dotted terminal of the fifth inductor;

wherein the filter capacitor of the storage battery terminal is connected with the storage battery in parallel, the drain of the third N-MOS transistor is connected with the drain of the second N-MOSFET, the source of the third N-MOS transistor is connected with the drain of the fourth N-MOS transistor Q4, the grid of the third N-MOS transistor is connected with the dotted terminal of the third inductor, and the opposite terminal of the third inductor is connected with a third driving circuit;

wherein the source of the fourth N-MOS transistor is connected with the dotted terminal of the fifth inductor, the grid of the fourth N-MOS transistor is connected with the dotted terminal of the fourth inductor, and the opposite terminal of the fifth inductor is connected with a fourth driving circuit; the source of the third N-MOS transistor is connected with the dotted terminal of the freewheeling inductor of the superbuck circuit, and the opposite terminal of the freewheeling inductor is connected with the input terminal of the storage battery;

wherein the first, second, fourth and fifth inductors are wound on a magnetic ring, the freewheeling and third inductors are wound on the other magnetic ring; and the first and second current ripple cancellation branches are used for cancelling the current ripple at the solar input side, the third current ripple cancellation branch is used for cancelling the current ripples at the battery side, and each current ripple cancellation branch is formed by connecting an independent inductor, a winding wound on the magnetic ring and a thin film capacitor in series.

2. The three-port converter with magnetic integration and zero port current ripple according to claim 1, wherein the first current ripple cancellation branch comprises a sixth inductor and a seventh inductor and a first capacitor, wherein the sixth inductor has one terminal connected with the input terminal of the solar battery and has the other terminal connected with the dotted terminal of the seventh inductor, and the opposite terminal of the seventh inductor is grounded through the third capacitor;

wherein the second current ripple cancellation branch comprises an eighth inductor, a ninth inductor and a capacitor C2, wherein the eighth inductor has one terminal connected with the input terminal of the solar battery and has the other terminal connected with the dotted terminal of the ninth inductor, and the opposite terminal of the eighth inductor is grounded through the second capacitor; and wherein the third current ripple cancellation branch comprises a tenth inductor, an eleventh inductor and a fourth capacitor C4, wherein the eleventh inductor has an opposite terminal connected with the input terminal of the storage battery and has the dotted terminal connected with one terminal of the tenth inductor, the other terminal of tenth inductor is grounded through the fourth capacitor C4, the sixth inductor is wound on the magnet ring, and the ninth and eleventh inductors are wound on the other magnet ring.

3. The three-port converter with magnetic integration and zero port current ripple according to claim 2, wherein the second and third capacitors are combined into one capacitor.

4. The three-port converter with magnetic integration and zero port current ripple according to claim 1, wherein the third and fourth N-MOS transistors are complementarily conducted, the third N-MOS transistor is used to fulfill a buck function when the storage battery is charged, and the fourth N-MOS transistor is used to fulfill a boost function when the storage battery discharges.

5. The three-port converter with magnetic integration and zero port current ripple according to claim 1, wherein the first N-NMOSTFET and the fourth N-MOS transistor perform driving by directly using two windings, and the second NMOSFET and the third N-MOS transistor implement high-side driving through the bootstrap level.

6. The three-port converter with magnetic integration and zero port current ripple according to claim 1, wherein a first solid-state current-limiting undervoltage protector is provided between the opposite terminal of the second inductor and the busbar output terminal, and a second solid-state current-limiting undervoltage protector is also provided between the opposite terminal of the freewheeling inductor and the battery terminal.

7. The three-port converter with magnetic integration and zero port current ripple according to claim 1, wherein each of the first and second solid-state current-limiting undervoltage protector consists of an N-MOSFET and a diode, and the diode has a positive electrode connected with the source of the N-MOSFET, and has a negative electrode connected with the drain of the N-MOSFET.

8. The three-port converter with magnetic integration and zero port current ripple according to claim 1, wherein diodes are provided between the sources and drains of the second NMOSFET and the third and fourth N-MOS transistors, and the diodes have positive electrodes connected with the sources of the transistors and have negative electrodes connected with the drains of the transistors.

* * * * *